US008411825B2

(12) United States Patent
Dutta et al.

(10) Patent No.: US 8,411,825 B2
(45) Date of Patent: Apr. 2, 2013

(54) METHOD, SYSTEM, AND COMPUTER PROGRAM PRODUCT FOR CONTACTING INTENDED CUSTOMERS

(75) Inventors: Siddhartha Dutta, Glendale, AZ (US); John Bowen, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 567 days.

(21) Appl. No.: 12/690,593

(22) Filed: Jan. 20, 2010

(65) Prior Publication Data

US 2011/0176665 A1 Jul. 21, 2011

(51) Int. Cl.
*H04M 1/64* (2006.01)
*H04M 7/00* (2006.01)

(52) U.S. Cl. ................................. 379/88.02; 379/221.01

(58) Field of Classification Search .... 379/88.01–88.23, 379/188–189, 201.02, 201.04, 211.02, 214.01, 379/266.07, 207.06; 709/225; 705/330
See application file for complete search history.

(56) References Cited

U.S. PATENT DOCUMENTS

| | | | |
|---|---|---|---|
| 6,282,269 B1* | 8/2001 | Bowater et al. | 379/88.17 |
| 7,298,831 B1* | 11/2007 | Keohane et al. | 379/88.23 |
| 7,519,163 B2* | 4/2009 | Cameron et al. | 379/38 |
| 7,746,987 B1* | 6/2010 | Becker et al. | 379/88.12 |
| 2003/0161448 A1* | 8/2003 | Parolkar et al. | 379/88.17 |
| 2005/0195954 A1* | 9/2005 | Klein et al. | 379/201.04 |
| 2006/0209786 A1* | 9/2006 | Chambers et al. | 370/351 |
| 2007/0118647 A1* | 5/2007 | Lee et al. | 709/225 |
| 2007/0274464 A1* | 11/2007 | Cameron et al. | 379/38 |
| 2008/0260129 A1* | 10/2008 | Parolkar et al. | 379/201.02 |
| 2008/0304643 A1* | 12/2008 | Hodge | 379/188 |
| 2009/0046837 A1* | 2/2009 | Thiel | 379/37 |
| 2009/0046841 A1* | 2/2009 | Hodge | 379/189 |
| 2011/0129081 A1* | 6/2011 | Segall | 379/266.07 |
| 2012/0033799 A1* | 2/2012 | Czachor et al. | 379/214.01 |
| 2012/0095934 A1* | 4/2012 | Klingenberg et al. | 705/330 |
| 2012/0099714 A1* | 4/2012 | Hodge | 379/88.16 |

* cited by examiner

*Primary Examiner* — Mohammad Islam
(74) *Attorney, Agent, or Firm* — Snell & Wilmer L.L.P.

(57) ABSTRACT

A method, system, and apparatus are used to contact an intended customer. In one embodiment, one or more notification details associated with an intended customer are received. The notification details may include at least a phone number and a name of the intended customer. Subsequently, a phone call to the intended customer is originated. One or more audio messages are played to a recipient of the phone call. Subsequently, one or more inputs from the recipient are received. Whether the recipient is the intended customer is determined based on the inputs provided. In one embodiment, the phone call is routed to an agent or an automated system if the recipient is the intended customer. In another embodiment, if the recipient is not the intended customer, the recipient may be prompted to provide availability information of the intended customer.

18 Claims, 5 Drawing Sheets

METHOD, SYSTEM, AND COMPUTER PROGRAM PRODUCT FOR CONTACTING INTENDED CUSTOMERS

BACKGROUND OF THE INVENTION

1. Field of the Invention

The present invention relates generally to automated outbound dialing systems, and more particularly to verifying an identity of a recipient of an outbound phone call, and whether the recipient is an intended customer.

2. Related Art

Enterprises that provide products and/or services often contact their customers for various purposes, such as informing customers about new products and/or services, informing customers about promotional offers and rewards, reminding customers about payment due dates, obtaining feedback to enhance their products and/or services, and the like. The enterprise may be, for example, a seller of consumer products, a bank, a travel agency, a telecommunication service provider, a credit card company, and the like. The enterprise may make use of outbound notification services to contact its customers by use of electronic messaging such as electronic mail, instant messaging, alerts, SMS, telephonic communication, voice channels, etc.

These enterprises often contact their customers through telephone calls. The enterprises may use outbound dialing systems to contact their customers. The enterprise customarily provides the outbound dialing system with a list of customers to be contacted. The outbound dialing systems automatically dial the telephone numbers of the customers in turn. The outbound dialing system then connects the phone call to a Customer Care Professional (CCP). Depending on the complexity of the system, the outbound dialing system may connect the phone call to a CCP when the phone call is being dialed, or when the phone call is connected, or when the phone call is answered by a live person.

Statistics reveal that only around 25% of connected phone calls launched by an outbound dialing system are answered by the particular customer that the enterprise wishes to contact. The remaining phone calls are answered by a person other than the customer, are directed to an incorrect phone number, or are otherwise unsuccessful in reaching the intended customer. This may lead to inefficient use of the CCP's time. To alleviate this inefficiency, the enterprise may need to employ additional CCPs to meet its target of contacting a predetermined number of customers. However, employing additional CCPs increases the operational costs of the enterprise.

Therefore, there is a need for methods and systems to overcome the aforementioned shortcomings.

BRIEF DESCRIPTION OF THE INVENTION

The present invention can meet the above-mentioned needs by providing methods, systems and computer program products for contacting an intended customer.

According to one embodiment of the present invention, there is disclosed a method for contacting an intended customer. The method includes receiving one or more notification details related to an intended customer. The notification details may include at least a name or a phone number of the intended customer. Subsequently, the method originates a phone call to the phone number of the intended customer. The method further plays one or more audio messages to a recipient of the phone call and receives one or more inputs from the recipient, in response to the one or more audio messages. The method next determines whether the recipient is the intended customer, based, at least in part, on the one or more inputs received from the recipient. The method may route the phone call to an agent if the recipient of the phone call is determined to be the intended customer. Alternatively, the method may play additional messages to attempt to reach the intended customer if the recipient of the phone call is not the intended customer.

According to another embodiment of the present invention, there is disclosed a system for contacting the intended customer. Various embodiments of the system include at least one processor, and a memory in communication with the at least one processor. The memory may be configured to store a plurality of processing instructions for directing the at least one processor to receive one or more notification details related to an intended customer. The notification details may include at least a name or a phone number of the intended customer. Subsequently, the processor originates a phone call to the phone number of the intended customer. The processor further plays one or more audio messages to a recipient of the phone call and receives one or more inputs, from the recipient, in response to the one or more audio messages. The processor next determines whether the recipient is the intended customer, based, at least in part, on the one or more inputs received from the recipient. The processor may route the phone call to an agent if the recipient of the phone call is determined to be the intended customer. Alternatively, the processor may play additional messages to attempt to reach the intended customer if the recipient of the phone call is not the intended customer.

According to another embodiment of the present invention, there is provided a computer program product for contacting intended customers. The computer program product includes a computer usable medium having control logic stored therein which, when executed, causes one or more processors to receive one or more notification details related to an intended customer. The notification details may include at least a name or a phone number of the intended customer. Subsequently, the control logic further causes the processor to originate a phone call to the phone number of the intended customer. The control logic further causes the processor to play one or more audio messages to a recipient of the phone call and receives one or more inputs from the recipient, in response to the one or more audio messages. The control logic next causes the processor to determine whether the recipient is the intended customer, based, at least in part, on the one or more inputs received from the recipient. The control logic may cause the processor to route the phone call to an agent if the recipient of the phone call is determined to be the intended customer. Alternatively, the control logic may cause the processor to play additional messages to attempt to reach the intended customer if the recipient of the phone call is not the intended customer.

Various embodiments of the present invention provide systems, methods, and computer program products for contacting intended customers. The various embodiments may also include performing one or more of the aforementioned functions independently and in any order, as needed.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

DETAILED DESCRIPTION

I. Overview

Figure 1:
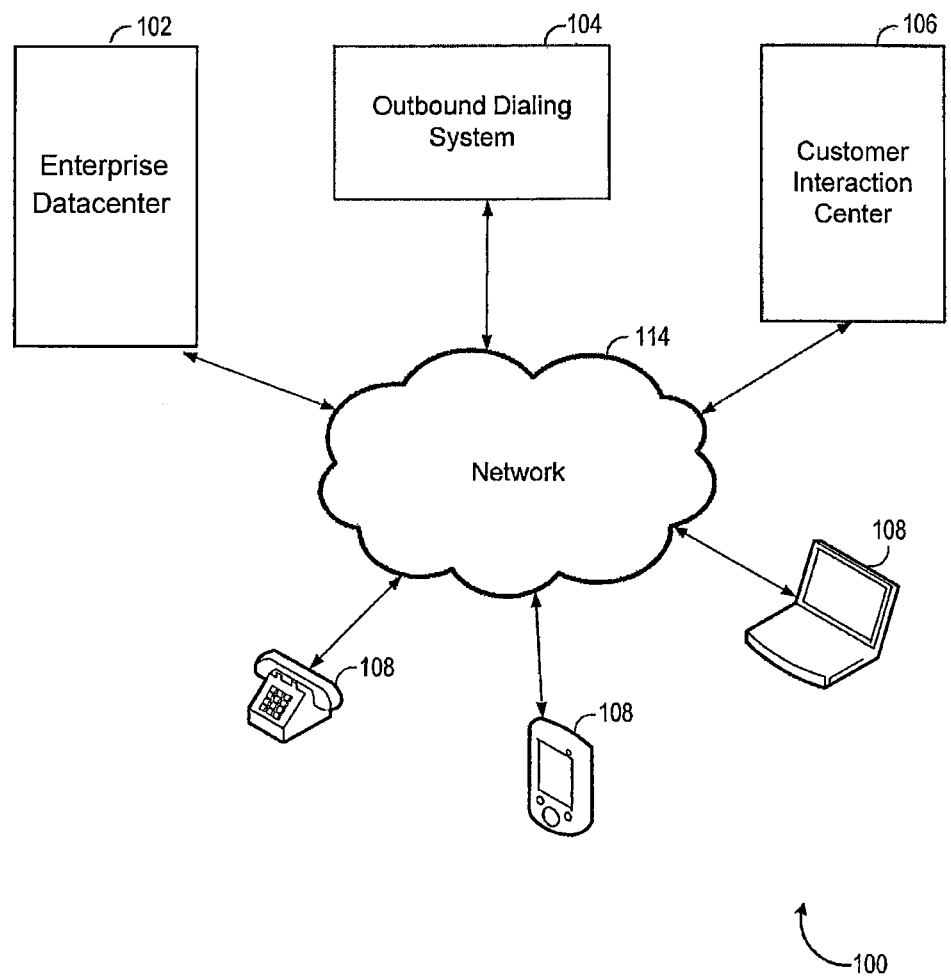
FIG. 1 is an exemplary environment in which a customer identification system may be deployed, according to one embodiment of the present invention.

The present invention is directed to systems, methods and apparatuses for customer identification. An enterprise may intend to notify its customers about particular services and/or products offered. As non-limiting examples, banks may intend to contact their customers to remind them about payments to be made, telecommunication service providers may intend to inform their customers about new schemes being offered, insurance agents may contact their customers to remind them about payment due dates, pharmaceutical companies may contact doctors to inform them about new drugs launched, and the like.

The term "enterprise" means an entity that may include, but is not limited to, an organization such as a bank, an insurance enterprise, a telecommunication service provider, a pharmaceutical enterprise, and the like. An enterprise initiates a communication cycle with customers.

The term "customers" means entities that may include, but are not limited to, individuals that an enterprise wishes to contact for a variety of reasons that may include, but are not limited to, reminding the customer about payments due, informing the customer about new membership schemes or related services, and the like.

The enterprise may wish to contact the customer by means of an outbound notification that includes, but is not limited to, a phone call. These phone calls may include, but are not limited to, audio messages that mention the customer's name, the enterprise and/or department of the enterprise on behalf of which the phone call was made, the reason the phone call was made, and the like.

The enterprise may associate with another entity, such as a "customer interaction center", to handle these phone calls to the customer. The customer interaction center may employ trained personnel, known as "Customer Care Professionals", to attend to these phone calls and suitably interact with the customers. The Customer. Care Professionals handle customer relationship management issues and act as a point of contact between the enterprise and its customers. In an embodiment of the present invention, these phone calls may also be serviced by suitable customer-care agents employed by the enterprise.

II. System

The present invention is now described in terms of an exemplary system, hereinafter referred to as "customer identification system", in which the present invention, in an embodiment, would be implemented. This is for convenience only and is not intended to limit the application of the present invention. It will be apparent to one skilled in the relevant art how to implement the present invention in alternative embodiments.

In one exemplary scenario, an enterprise may contact its customers for a variety of reasons. These reasons may include, but are not limited to, informing the customers about changed services and/or products offered, reminding the customers about renewing their memberships, notifying the customers about payments made by the usage of payment cards, and the like. These notifications may include, but are not limited to, reminders, news, updates and/or alerts, and may be delivered by SMS, electronic mail messaging, voice messaging, telephonic communication, and/or any other communications medium or format.

Various embodiments of the present invention may be deployed in different scenarios. In an embodiment, the enterprise may intend to contact its customers by means of telephonic communication, in the form of a phone call. The enterprise may make use of services provided by a customer interaction center to handle the queries of the customer related to the phone call initiated by the enterprise. FIG. 1 illustrates an exemplary customer identification system which includes a network environment 100 in which various implementations of the invention may be deployed, according to one embodiment of the present invention. Network environment 100 includes an enterprise datacenter 102, an outbound dialing system 104, customer interaction center 106, and one or more customer nodes 108. In various embodiments of the present invention, the enterprise datacenter 102 further includes one or more application servers. As shown in FIG. 1, network 114 represents one or more interconnected networks, over which the enterprise datacenter 102, outbound dialing system 104, and customer interaction center 106 communicate with each other and with customer nodes 108. Network 114 can be implemented as one or more of a packet-based wide area network (such as the Internet), Public Switched Telephone Network (PSTN), Public Land Mobile Network (PLMN), local area network (LAN), private network, wireless network, satellite network, cellular network, Voice over Internet Protocol (VoIP) network, and the like. It is apparent to a person of ordinarily skill in the art that network 114 may also be a combination of more than one type of network. For example, network 114 may be a combination of a LAN and the Internet. In addition, network 114 may be implemented as a wired network, a wireless network, or a combination thereof. Furthermore, customer nodes 108 are communicatively coupled to enterprise datacenter 102, outbound dialing system 104, and customer interaction center 106 via network 114.

Customer nodes 108 are electronic devices used to contact the customers. Customer nodes 108 have the capability to communicate over network 114. Furthermore, according to an embodiment of the present invention, customer nodes 108 have the capability to receive and transmit the customer's response over the network 114. Customer nodes 108 may include, but are not limited to, a telephone, a desktop computer, a laptop computer, a mobile phone, a personal digital assistant, and the like. Customer nodes 108 may connect to network 114 by means of digital and/or analog signals including, but not necessarily limited to, Time Division Multiplexing (TDM), Signaling System Number 7 (SS7), and the like. Further, the communication may involve the use of protocols such as, but not limited to, Session Initiation Protocol (SIP), Voice over Internet Protocol (VoIP), Real Time Protocol (RTP), Media Gateway Control Protocol (MGCP), Megaco (H.248), and the like. Customer nodes 108 may also use other wireless or mobile device protocol suites such as, without limitation, Nippon Telegraph and Telephone (NTT) DoCoMo's i-mode wireless network service protocol suites, Enhanced Data rates for GSM Evolution (EDGE), and the like.

Enterprise datacenter 102 may represent an enterprise that wishes to contact the customers for launching one or more campaigns. The application servers can be, but are not limited to, a combination of 1) a system (e.g., a web server) that houses a user interface for interacting with the called party during right party verification, which includes a callflow, audio files (and grammar files if speech recognition is used), 2) an alerting and scheduling engine that applies rules such as who to call, when to call, where to call (home, mobile phone, office), how many attempts, etc., on a list of customers and that triggers the outbound dialing system 104 to launch phone calls, and 3) an intelligent call routing and CTI engine that can exchange information regarding the call and the called party for connecting the verified called party with an appropriate, available agent. Alternatively, any of the servers, such as the alerting scheduling engine, can be located in the outbound dialing system as a discrete server or integrated with another server, such as a telephony server.

An application server may provide the customers' details required to launch the campaign and initiate phone calls between enterprise datacenter 102 and customer nodes 108 over network 114. The customers' details may include, but are not limited to, personal details such as name, age, and the like, contact details like telephone numbers, and/or any other information related to the customer. Furthermore, the customer may be an account holder with the enterprise and/or may have had prior dealings or association with the enterprise. Furthermore, the customer details may be acquired by the application server from other external sources such as, but not limited to, public databases, information repositories, referrals, and the like. Furthermore, the customer information may be stored in user profile database.

In an embodiment of the present invention, on initiation by an application server in enterprise data center 102, outbound dialing system 104 may be responsible for establishing the communication between enterprise datacenter 102 and customer nodes 108 by launching phone calls to the customers, appropriately playing one or more audio messages to the receiver of the phone call, accepting one or more responses from the receiver of the phone call, determining if the receiver of the phone call is the customer, and accordingly routing the phone call to an agent within the customer interaction center 106 and/or enterprise datacenter 102.

Customer interaction center 106 can include, but is not limited to, a contact center having agents servicing the customers. Alternatively, the calls need not get to a live agent after the intended customer is contacted (that is, post-verification). For instance, the outbound system can redirect the contacted parties to an automated system and have them interact with an application such as an Interactive Voice Response (IVR) application. The re-direction may include a physical call transfer to a different system at the same or different location, or a simple linkage to another application (not shown) at the outbound dialing system 104.

The customer interaction center 106 can further include a complex architecture of technology infrastructures comprising the switch (PBX/ACD), CTI infrastructures, recording systems, reporting and forecasting tools, etc., to effectively route phone calls to agents, and present appropriate information to the agents associated with the phone call. This provides for efficient handling of customer queries and reduced average call time, efficient staffing of agents to reduce hold/queue time, quality monitoring and compliance, etc.

Customer interaction center 106 receives the phone calls routed to it from outbound dialing system 104. Furthermore, in an embodiment of the present invention, the phone call is connected to an available Customer Care Professional (CCP), who attends to the phone call. The CCP may provide further information to the customer, respond to queries, and the like.

Figure 2:
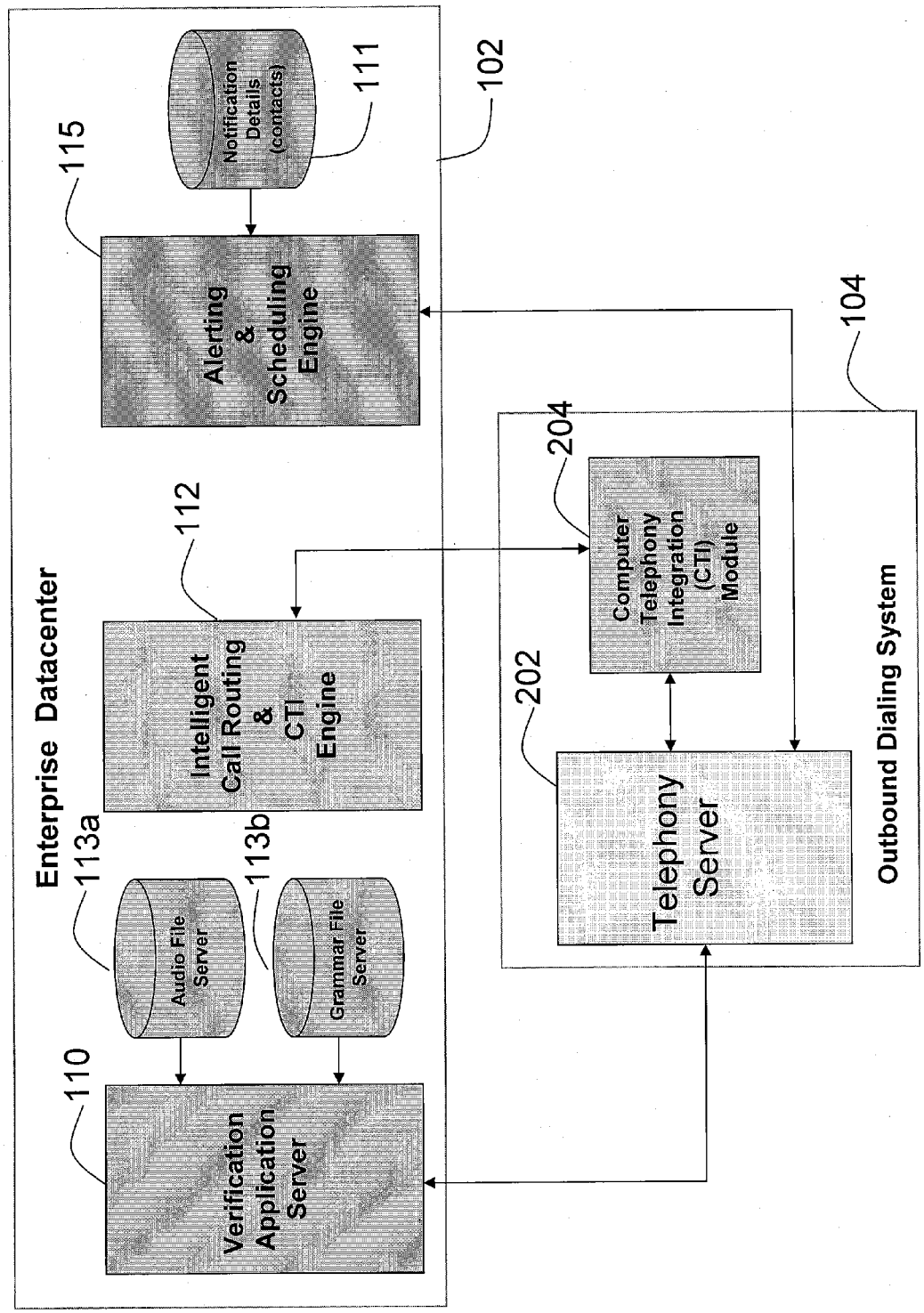
FIG. 2 is a simplified block diagram illustrating an exemplary implementation of the customer identification system, according to one embodiment of the present invention.

FIG. 2 illustrates a more detailed block diagram of enterprise data center 102 and outbound dialing system 104, in accordance with an embodiment of the present invention. For the sake of simplicity, network 114 is not shown in the figure. At enterprise datacenter 102, one of the application servers can comprise verification application server 110, another application server can comprise an intelligent call routing and computer telephony integration (CTI) engine 112, and yet another application server can comprise an alerting and scheduling engine 115. Outbound dialing system 104 includes a telephony server 202 and a CTI module 204 in one embodiment, but the CTI module 204 can also be hosted within the enterprise datacenter.

Telephony server 202 has voice response capabilities and telephony cards for interfacing with network 114. The telephony server may have linkages to the alerting and scheduling engine 112 that trigger the telephony server to launch phone calls. The telephony server may also have connections to verification application server 110 and intelligent call routing and CTI engine 112, which are located at enterprise datacenter 102. This connection to intelligent call routing and CTI engine 112 is made through CTI module 204, which acts as an interface to allow communication. The CTI module 204 allows the telephony server to send data associated with a call, such as customer name, phone number, customer inputs, verification result, etc., and allows the intelligent call routing and CTI engine 112 to pass a destination phone number to the telephony server to dial out. CTI module 204 may implement technologies and protocols that facilitate in the interaction and coordination between electronic devices such as a computer, a telephone, and the like, over network 114.

Verification application server 110 can be, but is not limited to, a simple voice response application (including VXML files, audio files, grammars, etc.) that prompts the called party to verify the identity based on a first or last (or both) name and collects the response from the called party through speech or DTMF inputs, and processes the inputs and provides a verification result. The result may be based on the particular actions of the telephony server or other actions with outbound dialing system 104. When the called party is to be connected to an agent, the telephony server sends a request to intelligent call routing and CTI engine 112 (for example, a Cisco ICM), asking for a destination phone number to which the call should be connected.

Enterprise datacenter 102 also includes a notification details/contacts database 111 and an audio (and grammar) storage 113a (113b) These storage devices can be any known storage devices and can be selected based on various parameters, such as the volume of data to be stored.

In various embodiments of the present invention, outbound dialing system 104 is deployed at enterprise datacenter 102 and/or at customer interaction center 106, or at a third-party vendor facility.

Enterprise datacenter 102 may wish to contact customers for a variety of reasons including, but not limited to, informing the customers about the enterprise's new schemes and/or services, providing the customers with information regarding renewal and/or upgrading of their membership, reminding customers about payment due dates, obtaining feedback on new products and/or services launched, and the like.

In an embodiment of the present invention, enterprise datacenter 102 contacts its customers by means of a phone call. These phone calls may be initiated by enterprise datacenter 102 with the intention of contacting an intended customer for a given reason.

In order to contact the intended customer, application server 110 provides one or more notification details of the intended customer to telephony server 202. The notification details may include, but are not limited to, the name of the intended customer, phone number of the intended customer, the reason the phone call was originated, the department and/or enterprise that initiated the phone call, and the like. Additionally, these notification details may also include, but are not limited to, other personal details of the intended customer such as, but not limited to, an email address, account number, and/or date of birth of the intended customer, and/or other customer identification information. In an embodiment of the present invention, the notification details may be stored in notifications details/contacts database 111.

Furthermore, telephony server 202 may create a call campaign with the provided notification details of the customer. Call campaign creation may involve, but is not limited to, formatting of the notification details of the intended customer according to pre-established standards such that the phone call may be made by telephony server 202. It is apparent to a person of ordinary skill in the art that any known method of creating call campaigns may be used and the embodiment shown in the FIG. 2 does not limit the scope of the present invention.

In an exemplary embodiment of the present invention, telephony server 202 launches the call campaigns created by alerting and scheduling engine 115 in enterprise datacenter 102. Telephony server 202 may originate the phone call to the intended customer over network 114. Network 114 can include, but is not limited to, a Public Switched Telephone Network (PSTN), Public Land Mobile Network (PLMN), wireless network, satellite network, cellular network, and/or Voice over Internet Protocol (VoIP) network.

Telephony server 202 may also allow the integration of various other channels such as faxing, paging, and the like. Telephony server 202 may implement auto dialing functionality and may be capable of handling the one or more calling campaigns sent on a plurality of lines to different customer nodes 108 via network 114. Telephony server 202 may also employ a variety of autodialing schemes including, but not limited to, preview dialing, progressive dialing, predictive dialing, and the like. Telephony server 202 may successively call the one or more phone numbers present in the call campaign until the connection with the customer has been established. Further, telephony server 202 may be capable of handling various telephony features including, but not limited to, handling of conference calls, handling of special information tones (SIT), busy lines, network intercepts, and the like. Telephony server 202 may employ voice detection algorithms to suitably detect when the phone call has been answered by an answering machine. Furthermore, telephony server 202 may suitably leave a message for call back and/or disconnect upon detecting an answering machine. The telephony server 202 can provide call progress detections, implemented through hardware or software or both.

In an embodiment of the present invention, telephony server 202 may act as an interface between verification module 206 and customer nodes 108, for connecting verification module 206 to customer nodes 108 when a recipient answers the phone call.

Subsequently, verification application server 110 plays one or more audio messages to the recipient of the phone call through the telephony server 202. Verification application server 110 may access pre-recorded audio clips, voice messages, or any other audio-related data stored in audio database 113a. In an embodiment of the present invention, the audio messages played may include, but are not limited to, a personalized message giving the name of the intended customer, the reason the call was originated, the department and/or enterprise that originated the phone call, and the like. In an exemplary embodiment of the present invention, when the recipient answers the phone call he or she may hear the following message: "Hello, this is an important call from ABC Company for Mr. Doe. We would like to verify recent charge activity on one of your accounts." It will be apparent to a person of ordinary skill in the art that the above-mentioned message is merely an illustrative example and does not limit the scope of the invention. A number of different messages may be employed without deviating from the spirit and scope of the present invention, depending on the application where the present invention is used, the context of the phone call, and other considerations such as privacy.

In another embodiment of the present invention, verification application server 110 may employ interactive voice response functionality such that verification application server 110 receives one or more inputs from the recipient of the phone call through customer nodes 108 via telephony server 202. The inputs may include, but are not limited to, DTMF tones, voice responses, and the like.

In additional embodiments, verification application server 110 may determine whether the recipient of the phone call is the intended customer based on the inputs provided by the recipient. For example, verification application server 110 may request the receiver of the phone call to confirm if he/she is the customer by pressing 1 or answering "yes", or alternatively pressing 2 or answering "no".

In another embodiment of the present invention, the audio messages played by verification application server may prompt the recipient of the phone call to provide identification information. Further, the identification information may include, but is not limited to, a name, an email address of the intended customer, account number of the intended customer, date of birth and/or any other information which identifies the intended customer. Verification module 206 determines whether the recipient is the intended customer by matching the identification information included in the more or more inputs received from the recipient with the one or more notification details of the intended customer received by call manger 202.

In another embodiment of the present invention, verification application server 110 may also determine whether the recipient is the intended customer based on speaker identification and/or speaker verification by voice printing, wherein the voice of the recipient of the phone call is compared to that of stored voice prints or biometrics of the intended customer. The identification may take place on the basis of the preliminary voice response that may include, but is not limited to, a salutation, and the like.

In an embodiment of the present invention, based on the identification of the recipient of the phone call, intelligent call routing and CTI engine 112 may cause telephony server 202 to route the phone call to a suitable application and/or agent for further servicing if the recipient of the phone call is identified as the intended customer. The agents may include, but are not limited to, CCPs employed with customer interaction center 106 and/or enterprise datacenter 102.

In other embodiments of the present invention, if the recipient of the phone call is not the intended customer, then verification application server 110 may play additional audio messages that may include, but are not limited to, requesting the customer to return the phone call, and/or prompting the recipient to provide availability information about the intended customer. Further, based on the received availability information, verification application server 110 performs additional actions, such as, but not limited to, calling the phone number received from the recipient of the phone call, holding the phone call for a duration specified by the recipient until the intended customer is available, and the like.

In additional embodiments of the present invention, verification application server 110 may employ a suitable algorithm to decide what questions to ask the recipient of the phone call when determined that the recipient is not the intended customer. These questions may include, but are not limited to, acquiring an alternative means to contact the customer, requesting when to call back, and the like.

In further embodiments of the present invention, verification application server 110 may extend its functionality to include compliance with standards like VoiceXML (VXML), Speech Recognition Grammar Specification (SRGS), Semantic Interpretation for Speech Recognition (SISR), Speech Synthesis Markup Language (SSML), Pronunciation Lexicon Specification (PLS), Call Control Extensible Markup Language (CCXML), and the like, used in speech interface frameworks.

Figure 3:
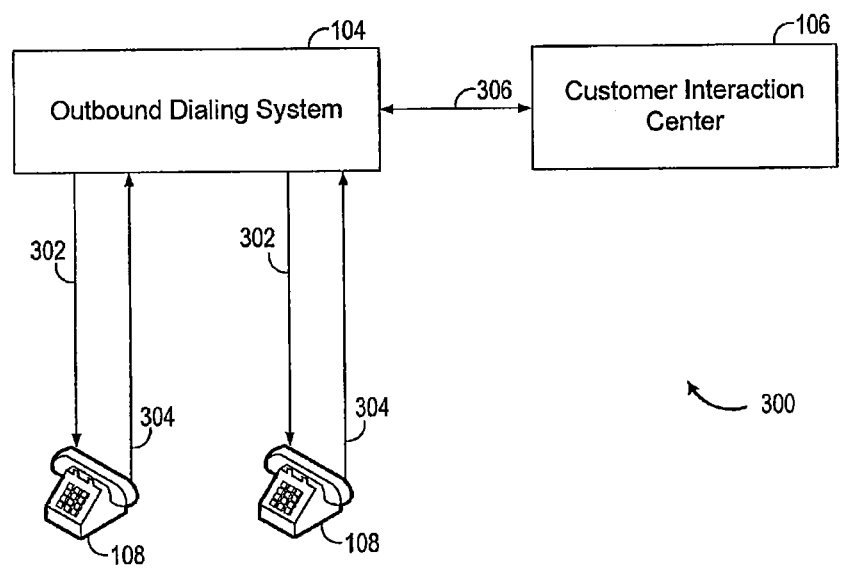
FIG. 3 is a schematic illustration of an exemplary implementation of two phone calls made to customers, according to one embodiment of the present invention.

FIG. 3 illustrates an exemplary implementation 300 of two phone calls, namely a first phone call and a second phone call, made to intended customers A and C at respective customer nodes 108 by outbound dialing system 104, according to an embodiment of the present invention.

Telephony server 202 may receive the notification details from enterprise datacenter 102 for the intended customers A and C. The notification details may include, but are not limited to, personal details, contact details and intended customer identification details.

Enterprise datacenter 102 creates two call campaigns: a first phone call whose intended customer is Mr. A, and a second phone call whose intended customer is Mr. C. The call campaigns are then sent to telephony server 202, which subsequently originates the first phone call and the second phone call over network 114. The phone calls may be launched by suitable dialing techniques such as, but not limited to, predictive dialing, preview dialing, and the like.

It will be apparent to a person of ordinary skill in the art that the first and second phone calls are independent of each other and may be launched either simultaneously on different lines or successively on the same line. Further, the first and second phone calls may be made over a variety of networks, such as, but not limited to, a Public Switched Telephone Network (PSTN), Public Land Mobile Network (PLMN), wireless network, satellite network, cellular network, Voice over Internet Protocol (VoIP) network, and the like.

The first and second phone calls are answered by recipients Mr. A and Mr. B, respectively, at the respective customer nodes 108. On answering of the first and second phone calls by Mr. A and Mr. B, respectively, verification application server 110 is suitably invoked in both cases.

At step 302, verification application server 110 interacts with the recipients of the first phone call and the second phone call. Verification application server 110 may play one or more audio messages to the respective recipients of the phone calls. The audio messages played are personalized voice messages that may be suitably addressed to the intended customers. Thus, for the first phone call, the personalized voice message played to recipient Mr. A may be: "Hello, this is an important call for Mr. A from XYZ Corporation. This call is related to your recent account activity."

Furthermore, for the second phone call the personalized voice message played to the recipient Mr. B may be: "Hello, this is an important call for Mr. C from XYZ Corporation. This call is related to your recent account activity."

The audio message may further prompt the recipient of the first and second phone call to provide a suitable input, such as, but not limited to, DTMF tones and/or voice responses. Thus, in this exemplary embodiment for the first phone call the audio message may be: "If you are Mr. A please press 1 or say yes; otherwise press 2 or say no." Furthermore, for the second phone call the audio message may be: "If you are Mr. C please press 1 or say yes; otherwise press 2 or say no."

In an embodiment of the present invention, at step 304, verification application server 110 may receive through telephony server 202 one or more inputs from recipient Mr. A for the first phone call and recipient Mr. B for the second phone call. In this exemplary embodiment, the recipient of the first phone call may respond by saying "yes". Subsequently, verification application server 110 may determine that the recipient of the first phone call is the intended customer based on the input provided. Furthermore, at step 306, verification application server 110 may perform one or more actions based on the identification made. In the exemplary embodiment, intelligent call routing and CTI engine 112 may cause telephony server 202 to route the first phone call to an agent, such as, but not limited to, CCPs employed in the customer interaction center 106 or enterprise datacenter 102 for further handling.

In another embodiment of the present invention, if at step 304, recipient Mr. B of the second phone call responds by pressing 2 or saying "no", then based on the input, verification application server 110 determines that Mr. B, the recipient of the second phone call, is not the intended customer Mr. C. In such a case, verification application server 110 may play one or more additional audio messages to the recipient of the phone call. In this case, the audio message may be: "Would I be able to reach Mr. C at this number?" In various embodiments of the present invention, verification application server 110 may play the audio message that prompts the recipient to provide availability information of the intended customer.

Furthermore, based on the inputs received from the recipient Mr. B, in response to the additional audio messages, verification application server 110 may perform one or more actions through telephony server 202 including, but not limited to, holding the phone call, calling an alternative phone number, calling back after a predetermined time period, or requesting a call back.

III. Process

Figure 4:
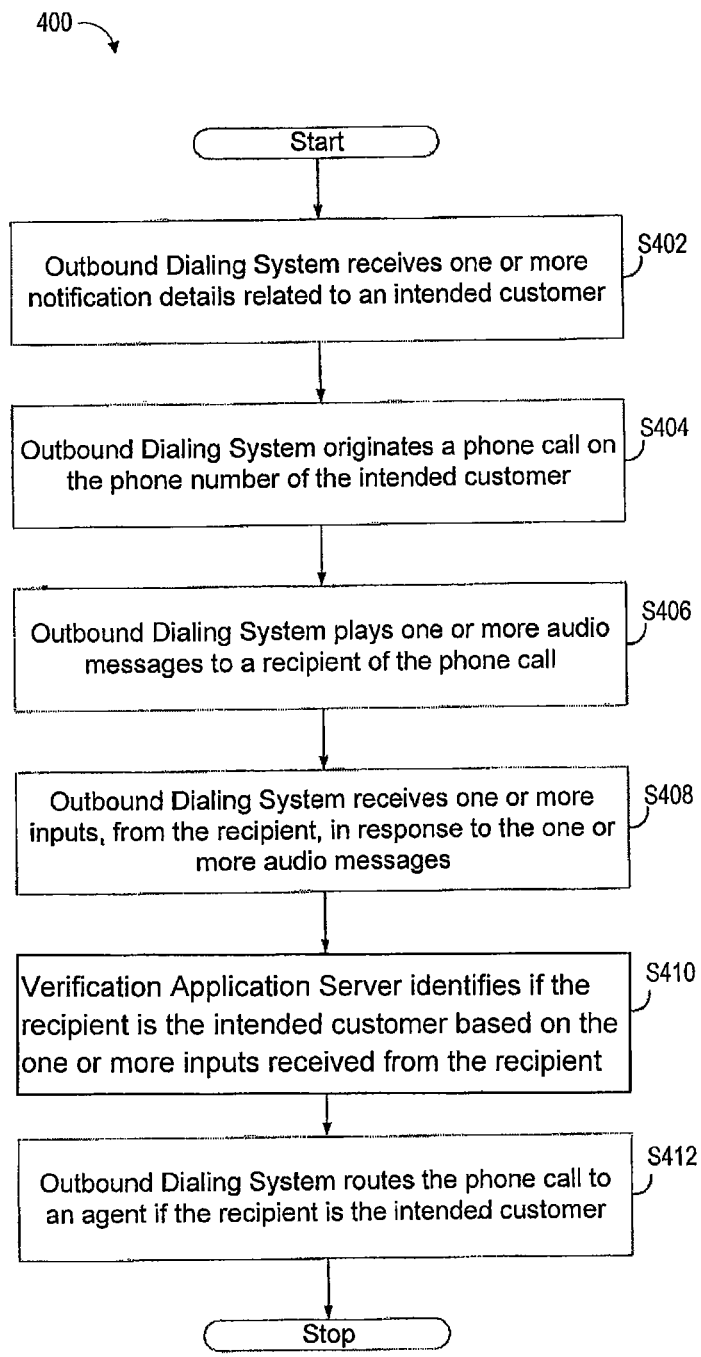
FIG. 4 is a flowchart illustrating one example process for determining whether the recipient of the phone call is an intended customer, according to one embodiment of the present invention.

FIG. 4 is a flowchart illustrating an exemplary process 400 for contacting an intended customer, according to an embodiment of the present invention. At step S402, telephony server 202 of outbound dialing system 104 receives one or more notification details associated with the intended customer. The notification details may include, but are not limited to, name, contact details such as a phone number, and the like. Further, the notification details may also include, but are not limited to, identification information such as date of birth, email address, and/or account number of the intended customer, and the like.

Alerting and scheduling engine 115 may create a call campaign based on the notification details of the intended customer. Furthermore, according to an embodiment of the present invention, the notification details are stored in notifications details/contacts database 111. In step S404, based on the call campaign, outbound dialing system 104 originates and launches a phone call to the intended customer over network 114.

At step S406, upon answering of the phone call by a recipient, verification application server 110 plays one or more audio messages to the recipient of the phone call through outbound dialing system 104. According to an embodiment of the present invention, the audio messages may include audio clips and/or voice messages retrieved from audio files database 113a. Further, the one or more audio messages may include personalized messages that mention the name of the customer, the enterprise and/or department of the enterprise on behalf of which the phone call was made, the reason the phone call was made, and the like.

At step S408, verification application server 110 interacts with the recipient of the phone call via the telephony server 202 by deploying suitable interactive voice response applications, and the like, in order to receive one or more inputs from the recipient of the phone call in response to the played audio messages. According to an embodiment, the inputs may be DTMF tones and/or voice responses. The inputs may correspond to suitable questions, either stored as audio messages and/or dynamically generated by verification application server 110. Furthermore, the input may include, but is not limited to identification information such as name, email address, account number, and the like.

At step S410, verification application server 110 determines whether the recipient is the intended customer based on the inputs received in response to the audio messages. In an embodiment of the present invention, verification application server 110 may identify the intended customer by matching the identification information input by the recipient of the phone call with notification details received by telephony server 202. Furthermore, in another embodiment of the present invention, verification application server 110 may identify the recipient of the phone call based on technologies such as voice printing, speaker identification, speaker verification, and the like.

At step S412, based on the identification, if the recipient of the phone call is the intended customer, then telephony server 202 routes the phone call for servicing by an application and/or an agent that may include, but is not limited to, customer care professionals employed at customer interaction center 106 and/or customer care employees at enterprise datacenter 102. In various other embodiments of the present invention, if the recipient is not the intended customer, verification application server 110 plays one or more additional audio messages to the recipient. The additional audio messages may prompt the recipient to provide availability information of the intended customer, which may include, but is not limited to, requesting an appropriate time to call back, requesting for an alternative phone number, and the like. In an embodiment of the present invention, based on the availability information of the intended customer, verification application server 110 may further perform one or more actions which may include, but is not limited to, calling back at a later time specified, holding the phone call for a specified time, calling an alternative phone number, requesting a call back, and the like.

IV. Example Implementations

The present invention may be implemented using hardware, software or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in many cases, in any of the operations described herein, which form a part of the present invention. Rather, the operations are machine operations. Useful machines for performing the operations in the present invention may include general-purpose digital computers or similar devices.

Figure 5:
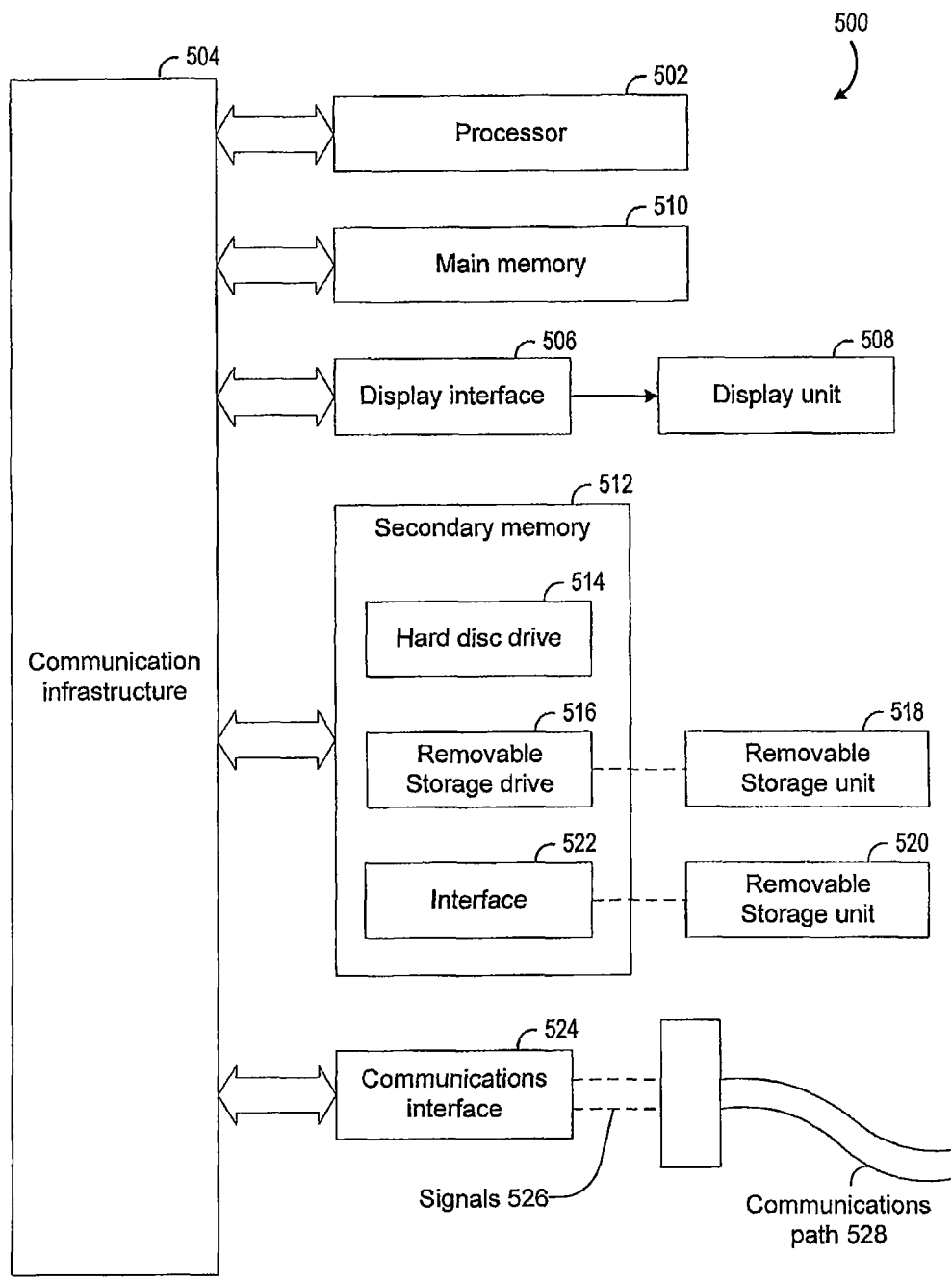
FIG. 5 is a block diagram of an exemplary computer system for implementing the present invention.

In fact, in accordance with an embodiment of the present invention, the present invention is directed towards one or more computer systems capable of carrying out the functionality described herein. An example of the computer systems includes a computer system 500, which is shown in FIG. 5.

The computer system 500 includes at least one processor, such as a processor 502. Processor 502 is connected to a communication infrastructure 504, for example, a communications bus, a cross over bar, a network, and the like. Various software embodiments are described in terms of this exemplary computer system 500. After reading this description, it will become apparent to a person skilled in the relevant art(s) how to implement the present invention using other computer systems and/or architectures.

The computer system 500 includes a display interface 506 that forwards graphics, text, and other data from the communication infrastructure 504 (or from a frame buffer which is not shown in FIG. 5) for display on a display unit 508.

The computer system 500 further includes a main memory 510, such as random access memory (RAM), and may also include a secondary memory 512. The secondary memory 512 may further include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a well known manner. The removable storage unit 518 may represent a floppy disk, magnetic tape or an optical disk, and may be read by and written to by the removable storage drive 516. As will be appreciated, the removable storage unit 518 includes a computer usable storage medium having stored therein computer software and/or data.

In accordance with various embodiments of the present invention, the secondary memory 512 may include other similar devices for allowing computer programs or other instructions to be loaded into the computer system 500. Such devices may include, for example, a removable storage unit 520, and an interface 522. Examples of such may include a program cartridge and cartridge interface (such as that found in video game devices), a removable memory chip (such as an erasable programmable read only memory (EPROM), or programmable read only memory (PROM)) and associated socket, and other removable storage units 520 and interfaces 522, which allow software and data to be transferred from the removable storage unit 520 to the computer system 500.

The computer system 500 may further include a communication interface 524. The communication interface 524 allows software and data to be transferred between the computer system 500 and external devices. Examples of the communication interface 524 include, but may not be limited to a modem, a network interface (such as an Ethernet card), a communications port, a Personal Computer Memory Card International Association (PCMCIA) slot and card, and the like. Software and data transferred via the communication interface 524 are in the form of a plurality of signals, hereinafter referred to as signals 526, which may be electronic, electromagnetic, optical or other signals capable of being received by the communication interface 524. The signals 526 are provided to the communication interface 524 via a communication path (e.g., channel) 528. A communication path 528 carries the signals 526 and may be implemented using wire or cable, fiber optics, a telephone line, a cellular link, a radio frequency (RF) link and other communication channels.

In this document, the terms "computer program medium" and "computer usable medium" are used to generally refer to media such as the removable storage drive 516, a hard disk installed in hard disk drive 514, the signals 526, and the like. These computer program products provide software to the computer system 500. The present invention is directed to such computer program products.

Computer programs (also referred to as computer control logic) are stored in the main memory 510 and/or the secondary memory 512. Computer programs may also be received via the communication infrastructure 504. Such computer programs, when executed, enable the computer system 500 to perform the features of the present invention, as discussed herein. In particular, the computer programs, when executed, enable the processor 502 to perform the features of the present invention. Accordingly, such computer programs represent controllers of the computer system 500.

In accordance with an embodiment of the invention, where the invention is implemented using a software, the software may be stored in a computer program product and loaded into the computer system 500 using the removable storage drive 516, the hard disk drive 514 or the communication interface 524. The control logic (software), when executed by the processor 502, causes the processor 502 to perform the functions of the present invention as described herein.

In another embodiment, the present invention is implemented primarily in hardware using, for example, hardware components such as application specific integrated circuits (ASIC). Implementation of the hardware state machine so as to perform the functions described herein will be apparent to persons skilled in the relevant art(s).

In yet another embodiment, the present invention is implemented using a combination of both the hardware and the software.

V. Conclusion

The various embodiments of the present invention described above have been presented by way of example and not limitation. It will be apparent to persons skilled in the relevant art(s) that various changes in form and detail can be made therein (e.g., different hardware, communications protocols, and the like) without departing from the spirit and scope of the present invention. Thus, the present invention should not be limited by any of the above-described exemplary embodiments, but should be defined only in accordance with the following claims and their equivalents. It is also to be understood that the steps and processes recited in the claims need not be performed in the order presented.

In addition, it should be understood that the attached drawings, which highlight the functionality and advantages of the present invention, are presented as illustrative examples. The architecture of the present invention is sufficiently flexible and configurable, such that it may be utilized (and navigated) in ways other than that shown in the drawings.

Further, the purpose of the appended Abstract is to enable the U.S. Patent and Trademark Office and the public generally, and especially scientists, engineers, and practitioners in the relevant art(s), who are not familiar with patent or legal terms and/or phraseology, to determine quickly from a cursory inspection the nature and essence of the technical subject matter disclosed herein. The Abstract is not intended to be limiting as to the scope of the present invention in any way.

We claim:

1. A method comprising:
   receiving, by a computer-based system for contacting an intended customer, one or more notification details related to the intended customer, wherein the notification details include at least a name and a phone number of the intended customer;
   originating, by the computer-based system, a phone call to the phone number of the intended customer;
   playing, by the computer-based system, one or more audio messages to a recipient of the phone call;
   receiving, by the computer-based system, one or more inputs, from the recipient, in response to the one or more audio messages;
   determining, by the computer-based system, whether the recipient is the intended customer based, at least in part, on the one or more inputs received from the recipient;
   verifying, by the computer-based system, an identity of the recipient by comparing a received input from the recipient to a stored voice print of the intended customer;
   routing, by the computer-based system, the phone call to at least one of an agent or an automated system in response to the recipient of the phone call being verified as the intended customer;
   playing, by the computer-based system, additional audio messages to the recipient of the phone call in response to the recipient not being the intended customer, wherein the additional audio messages prompt the recipient to provide availability information of the intended customer;
   receiving, by the computer-based system, availability information, from the recipient, of the intended customer, in response to the additional audio messages; and
   performing, by the computer-based system, at least one of holding the phone call, calling an alternative phone number, calling back after a predetermined time period, or requesting for a call back based, at least in part, on the received availability information of the intended customer.

2. The method of claim 1, wherein the one or more audio messages comprise prerecorded personalized audio prompts based, at least in part, on the one or more notification details of the intended customer.

3. The method of claim 1, wherein the one or more audio messages prompt the recipient of the phone call to provide identification information.

4. The method of claim 3, wherein the identification information comprises at least one of a first name, an email address, an account number, and a date of birth.

5. The method of claim 1, wherein said step of determining comprises matching the identification information included in the one or more inputs received from the recipient with the one or more notification details of the intended customer.

6. The method of claim 1, wherein the one or more inputs in response to the one or more audio messages comprise at least one of DTMF tones and voice responses.

7. The method of claim 1, wherein the phone call is originated over at least one of a Public Switched Telephone Network (PSTN), Public Land Mobile Network (PLMN), wireless network, satellite network, cellular network, and/or Voice over Internet Protocol (VoIP) network.

8. The method of claim 1, wherein the computer based system employs one or more of Voice Extensible Markup Language (VXML), Call Control eXtensible Markup Language (CCXML), Speech Synthesis Markup Language (SSML), Speech Recognition Grammar Specification (SRGS), Semantic Interpretation for Speech Recognition (SISR), or Pronunciation Lexicon Specification (PLS).

9. A system comprising:
   at least one processor; and
   a memory in communication with the at least one processor, the memory storing a plurality of processing instructions for directing the at least one processor to:
      receive, at a server, one or more notification details related to an intended customer, wherein the notification details include at least a name and a phone number of the intended customer;

originate, by the processor, a phone call to the phone number of the intended customer;

play, by the processor, one or more audio messages to a recipient of the phone call;

receive, by the processor, one or more inputs, from the recipient, in response to the one or more audio messages;

determine, by the processor, whether the recipient is the intended customer based, at least in part, on the one or more inputs received from the recipient;

verifying, by the processor, an identity of the recipient by comparing a received input from the recipient to a stored voice print of the intended customer;

route, by the processor, the phone call to at least one of an agent or an automated system in response to the recipient of the phone call being verified as the intended customer;

play, by the processor, additional audio messages to the recipient of the phone call in response to the recipient not being the intended customer, wherein the additional audio messages prompt the recipient to provide availability information of the intended customer;

receive, by the processor, availability information, from the recipient, of the intended customer, in response to the additional audio messages; and perform, by the processor, at least one of holding the phone call, calling an alternative phone number, calling back after a predetermined time period, or requesting for a call back based, at least in part, on the received availability information of the intended customer.

10. The system of claim 9, wherein the one or more audio messages comprise prerecorded personalized audio prompts based, at least in part, on the one or more notification details of the intended customer.

11. The system of claim 9, wherein the one or more audio messages prompt the recipient of the phone call to provide identification information.

12. The system of claim 11, wherein the identification information comprises at least one of a first name, an email address, an account number, and a date of birth.

13. The system of claim 9, wherein said determining comprises matching the identification information included in the one or more inputs received from the recipient with the one or more notification details of the intended customer.

14. The system of claim 9, wherein the one or more inputs in response to the one or more audio messages comprise at least one of DTMF tones and voice responses.

15. The system of claim 9, wherein the phone call is originated over at least one of a Public Switched Telephone Network (PSTN), Public Land Mobile Network (PLMN), wireless network, satellite network, cellular network, and/or Voice over Internet Protocol (VoIP) network.

16. The system of claim 9, wherein the computer based system employs one or more of Voice Extensible Markup Language (VXML), Call Control eXtensible Markup Language (CCXML), Speech Synthesis Markup Language (SSML), Speech Recognition Grammar Specification (SRGS), Semantic Interpretation for Speech Recognition (SISR), or Pronunciation Lexicon Specification (PLS).

17. An article of manufacture including a non-transitory, tangible computer readable storage medium having instructions stored thereon that, in response to execution by a computer-based system for contacting an intended customer, cause the computer-based system to perform operations comprising:

receiving, by the computer-based system, one or more notification details related to the intended customer, wherein the notification details include at least a name and a phone number of the intended customer;

originating, by the computer-based system, a phone call to the phone number of the intended customer;

playing, by the computer-based system, one or more audio messages to a recipient of the phone call;

receiving, by the computer-based system, one or more inputs, from the recipient, in response to the one or more audio messages;

determining, by the computer-based system, whether the recipient is the intended customer based, at least in part, on the one or more inputs received from the recipient;

verifying, by the computer-based system, an identity of the recipient by comparing a received input from the recipient to a stored voice print of the intended customer;

routing, by the computer-based system, the phone call to at least one of an agent or an automated system in response to the recipient of the phone call being verified as the intended customer;

playing, by the computer based system, additional audio messages to the recipient of the phone call in response to the recipient not being the intended customer, wherein the additional audio messages prompt the recipient to provide availability information of the intended customer;

receiving, by the computer based system, availability information, from the recipient, of the intended customer, in response to the additional audio messages; and performing, by the computer based system, at least one of holding the phone call, calling an alternative phone number, calling back after a predetermined time period, or requesting for a call back based, at least in part, on the received availability information of the intended customer.

18. The article of manufacture of claim 17, wherein the determining further comprises determining whether the recipient is the intended customer by matching the identification information included in the one or more inputs received from the recipient with the one or more notification details of the intended customer.

\* \* \* \* \*